United States Patent [19]
Tanaka et al.

[11] Patent Number: 4,586,793
[45] Date of Patent: May 6, 1986

[54] ZOOM LENS

[75] Inventors: Tsunefumi Tanaka; Keiji Ikemori, both of Kanagawa, Japan

[73] Assignee: Canon Kabushiki Kaisha, Tokyo, Japan

[21] Appl. No.: 478,890

[22] Filed: Mar. 25, 1983

[30] Foreign Application Priority Data

Apr. 12, 1982 [JP] Japan .................... 57-60815

[51] Int. Cl.$^4$ .............. G02B 9/64; G02B 15/177
[52] U.S. Cl. ............................ 350/426; 350/423
[58] Field of Search ..................... 350/426, 423

[56] References Cited

U.S. PATENT DOCUMENTS 4,198,128 4/1980 Ogino ........................... 350/423
4,465,343 8/1984 Horimoto ..................... 350/427

FOREIGN PATENT DOCUMENTS

0026816 2/1982 Japan ............................ 350/423

Primary Examiner—John K. Corbin
Assistant Examiner—Rebecca D. Gass
Attorney, Agent, or Firm—Toren, McGeady, Stanger, Goldberg & Kiel

[57] ABSTRACT

A zoom lens having a 1st lens component of negative power counting from front, and a 2nd lens component of positive power, with an air separation therebetween being varied to effect zooming, wherein said 2nd component is divided into two components one of which is made movable for focusing, thus minimizing the bulk and size of the entire system, while still achieving good correction of aberrations.

8 Claims, 58 Drawing Figures

FIG.7-1
F NO/4.0
d-LINE
S.C
g-LINE
f=100
-2.00  2.00
SPHERICAL ABERRATION
SINE CONDITION

FIG.7-2
w=62°
M  S
-2.00  2.00
ASTIGMATISM

FIG.7-3
w=62°
-5.00  5.00
DISTORTION(%)

FIG.7-4
d-LINE
F NO/4.0
S.C
g-LINE
f=146.08
-2.00  2.00
SPHERICAL ABERRATION
SINE CONDITION

FIG.7-5
w=44.7°
M  S
-2.00  2.00
ASTIGMATISM

FIG.7-6
w=44.7°
-5.00  5.00
DISTORTION(%)

FIG.7-7
d-LINE
F NO/4.0
S.C
g-LINE
f=192.17
-2.00  2.00
SPHERICAL ABERRATION
SINE CONDITION

FIG.7-8
w=34.8°
M  S
-2.00  2.00
ASTIGMATISM

FIG.7-9
w=34.8°
-5.00  5.00
DISTORTION(%)

ZOOM LENS

BACKGROUND OF THE INVENTION

1. Field of the Invention:

This invention relates to a zoom lens, and more particularly to a focusing method for use in the type of zoom lens which has two components of negative and positive powers in this order from the front with the air separation therebetween being varied to effect zooming, or so-called two-component zoom lenses.

2. Description of the Prior Art

In the past, most of the zoom lenses have employed the so-called front focusing method which has the purpose of moving the frontmost lens component of the lens system to effect focusing. Also, the zoom lens in the form of comprising, from front to rear, a 1st component for focusing, a 2nd component for variation of the image magnification, a 3rd component for image shift compensation, and a 4th component for image formation, or the so-called 4-component zoom lens, provides stabilization of the position of the image plane against later actuation of any zooming after the in-focus condition has once been established on a certain object distance, regardless of what value it takes. On the other hand, the so-called two-component zoom lens employing the front focusing method tends to displace its image plane though very slightly, as zooming follows focusing. Since, however, the amount of this displacement is so small that no problem arises in actual practice, the front focusing method has found its use in many kinds of zoom lenses.

The use of the front focusing method, however, leads to forward axial movement of the front component as focusing is effected down to shorter object distances, with the result that aberrations are rapidly increased, and the illumination of the corners of the picture frame is appreciably lowered. To avoid this, the outer diameter of the front lens members must be increased, and a complicated lens form must be taken. This makes the optical system bulky and heavy and further renders it impossible to achieve a much-desired shortening of the lower limit of the focusing range. Another drawback arising from the use of an automatic focusing device in the camera is that when the component movable for focusing is heavy and bulky, the load to the focusing drive system is large and the speed up to the establishment of the in-focus condition becomes slow.

For this reason, many proposals on the focusing method by moving the rear lens component which has a smaller diameter have been made.

As zoom lenses having the focusing provision at part of the rear lens component, mention may be made of those disclosed in Japanese Laid-Open Patent Application No. Sho 57-26816, and U.S. Pat. Nos. 3,391,973, 4,110,006, 4,145,115 and 4,231,636.

SUMMARY OF THE INVENTION

It is an object of the present invention to eliminate the above-described drawbacks of the front focusing method by making use of those of the lens elements of a zoom lens system which lie at a relatively rear position and are of light weight for focusing, and to provide a focusing method for zoom lenses which is able to form the lens system of reduced weight and size and which is also compatible even with an automatic focusing device.

To achieve this, one of the features of the invention is that, for a zoom lens having a 1st component counting from front of negative power and a 2nd component of positive power, or a so-called two-component zoom lens, with the air separation between these two components being varied to effect zooming, the 2nd lens component is divided into a plurality of parts, one of which is made axially movable for focusing purposes.

BRIEF DESCRIPTION OF THE DRAWINGS

FIGS. 5-1 through -9 and 6-1 through -9 are graphic representations of the aberrations of the lens of FIG. 2 with an object at infinity and at a distance of 0.6 meters (as measured from the film plane) respectively.

FIGS. 7-1 through -9, 8-1 through -9, 9-1 through -9 and 10-1 through -9 are graphic representations of the aberrations of the lenses of FIGS. 3 and 4 respectively with an object at infinity and at a distance of 0.6 meters (from the film plane).

DETAILED DESCRIPTION OF THE PREFERRED EMBODIMENTS

The principles on the focusing method of the zoom lens according to the present invention are explained below in connection with an embodiment thereof by reference to FIG. 1. The zoom lens of FIG. 1 comprises, from front to rear, a 1st lens component I having a negative refractive power and a 2nd lens component II with its front and rear parts $II_1$ and $II_2$ of positive and negative refractive powers respectively contributing to a positive refractive power as a whole, zooming being performed by varying the air separation between the 1st and 2nd lens components. During this time, as zooming from the wide angle to the telephoto position, the front and rear components of the 2nd lens component II are moved as a unit so as to approach the 1st lens component I. And focusing is carried out by moving either one of the subcomponents $II_1$ and $II_2$ constituting the 2nd lens component II.

Figure 1:
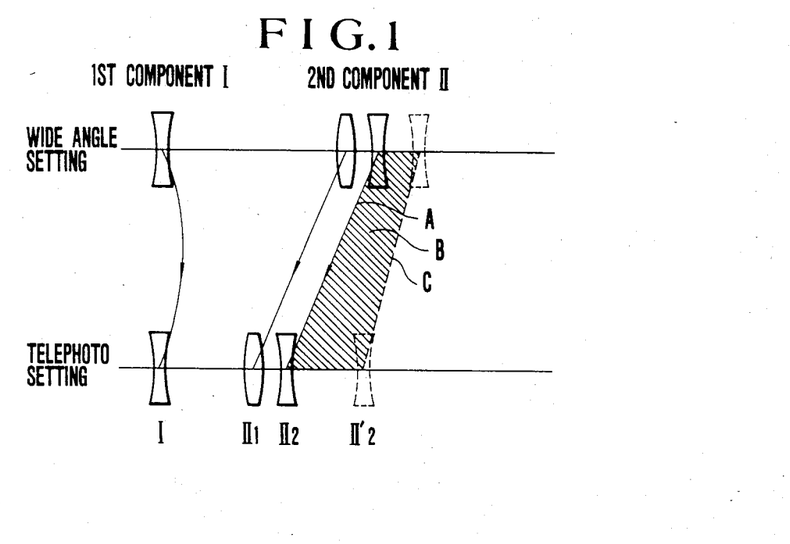
FIG. 1 is a schematic diagram illustrating the focusing method for the zoom lens of the invention.
Figure 2:
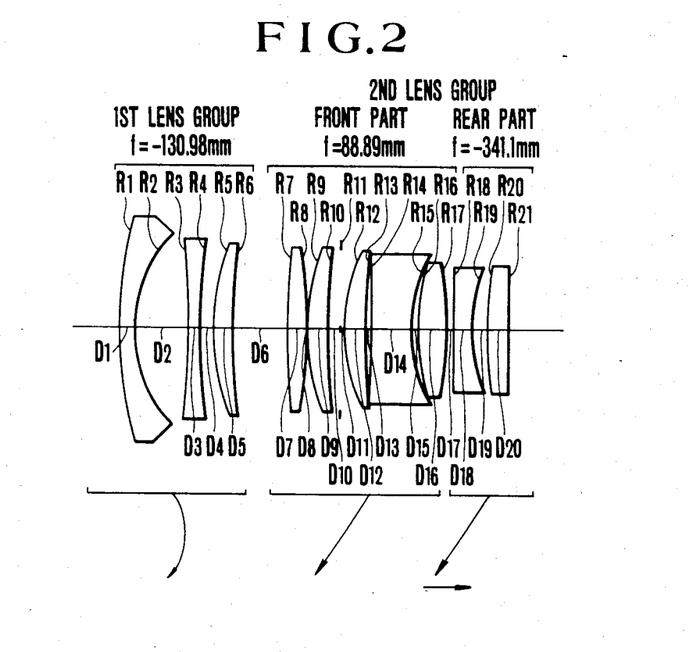
FIGS. 2, 3 and 4 are longitudinal section views of specific embodiments 1, 2 and 3 respectively of zoom lenses according to the present invention.
Figure 3:
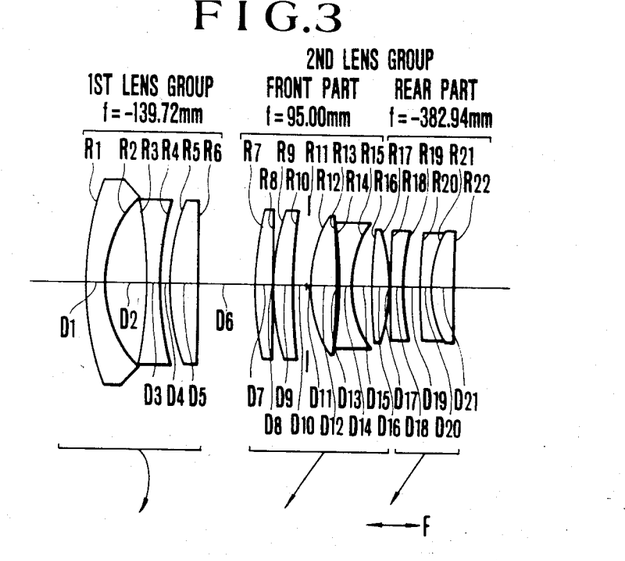
Figure 4:
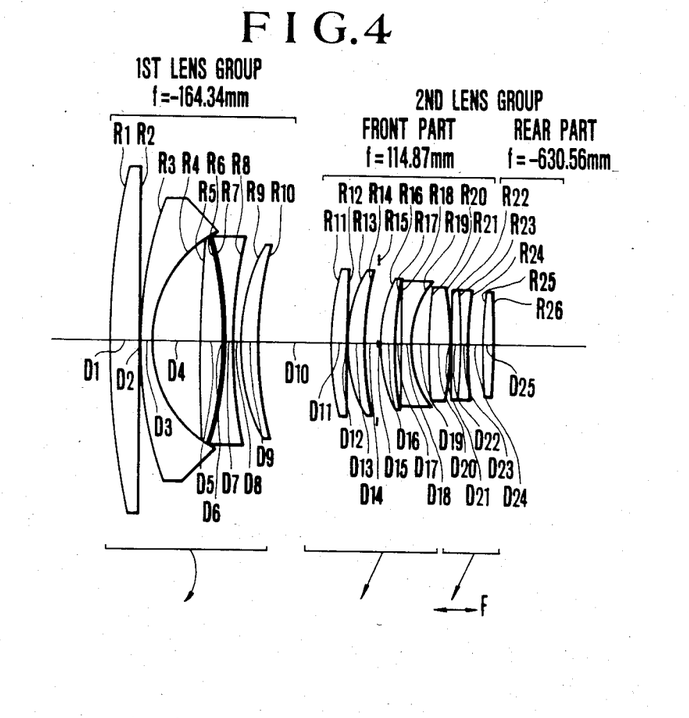
Figure 51:
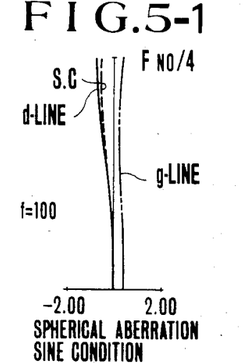
Figure 52:
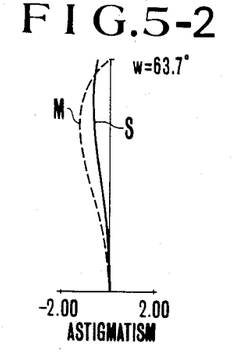
Figure 53:
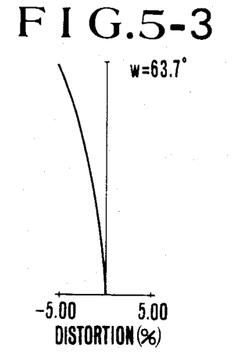
Figure 54:
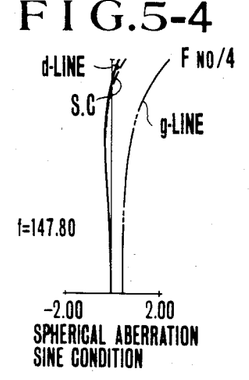
Figure 55:
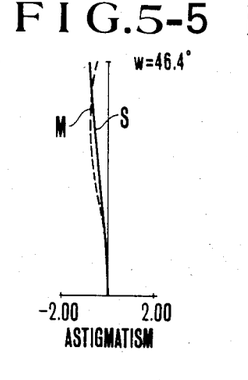
Figure 56:
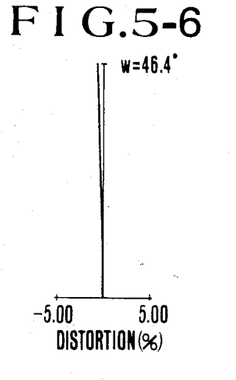
Figure 57:
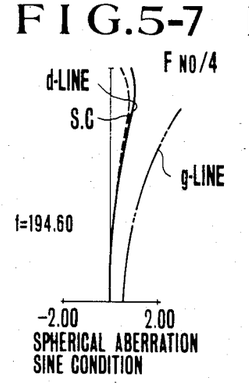
Figure 58:
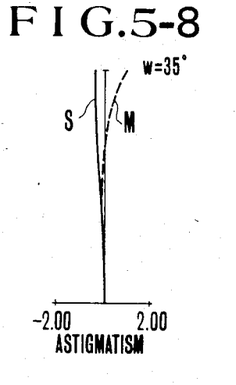
Figure 59:
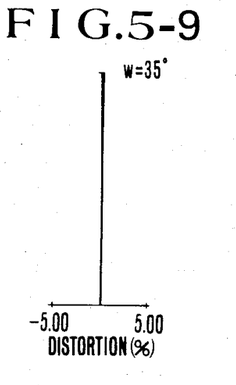
Figure 61:
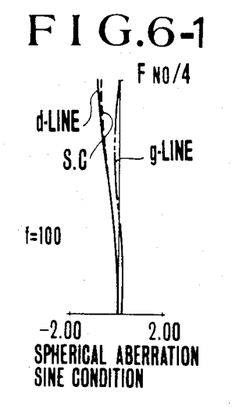
Figure 62:
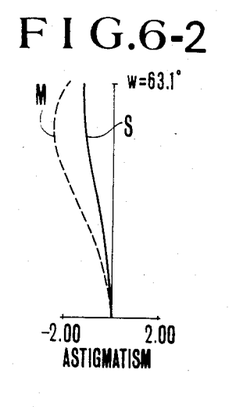
Figure 63:
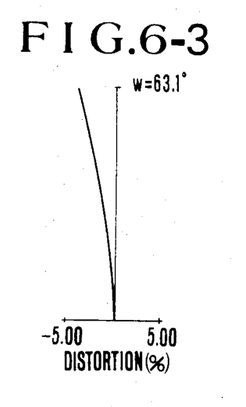
Figure 64:
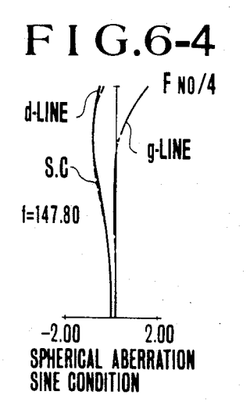
Figure 65:
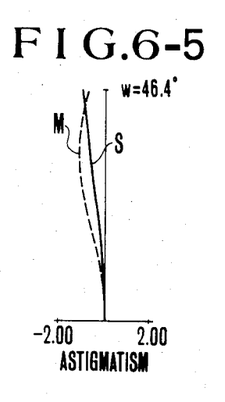
Figure 66:
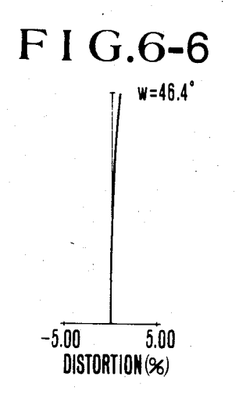
Figure 67:
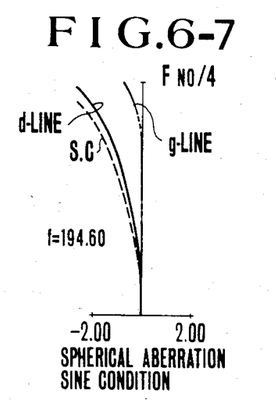
Figure 68:
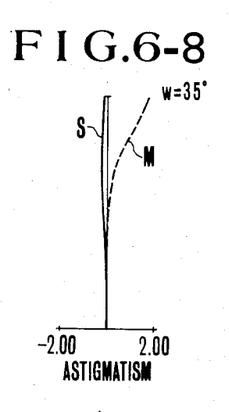
Figure 69:
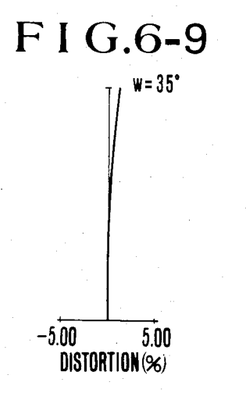
Figure 71:
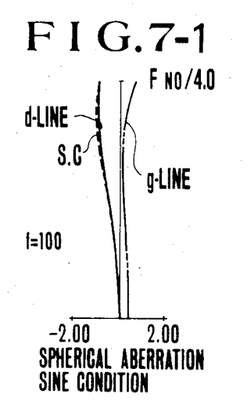
Figure 72:
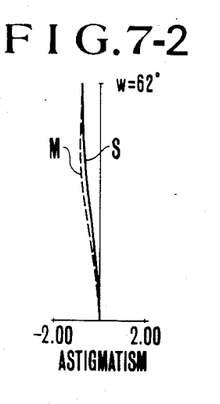
Figure 73:
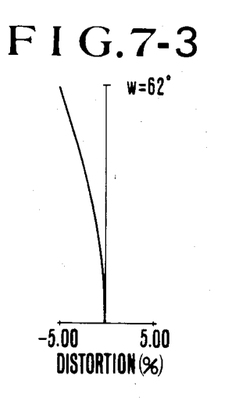
Figure 74:
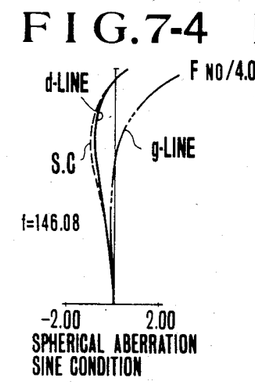
Figure 75:
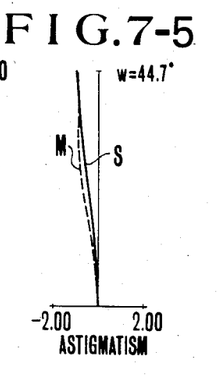
Figure 76:
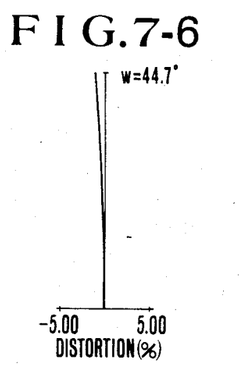
Figure 77:
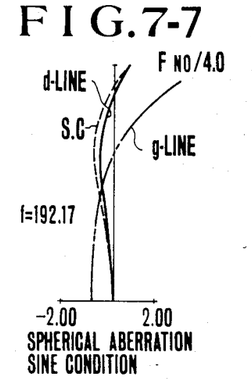
Figure 78:
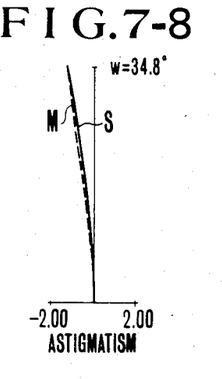
Figure 79:
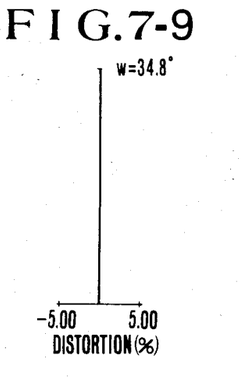
Figure 81:
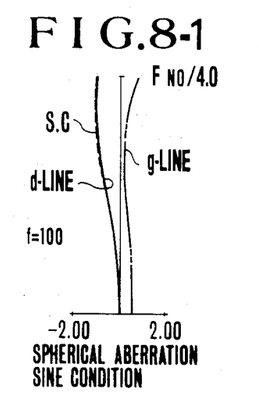
Figure 82:
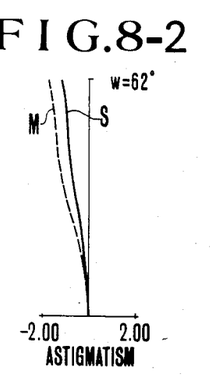
Figure 83:
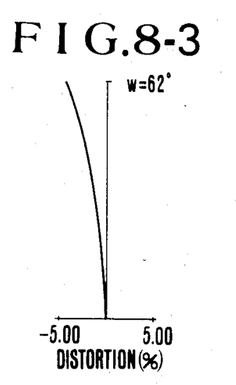
Figure 84:
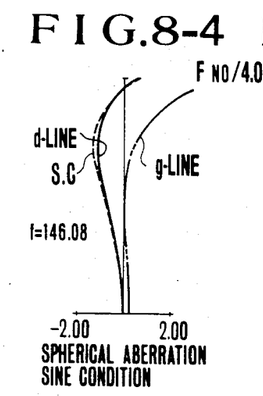
Figure 85:
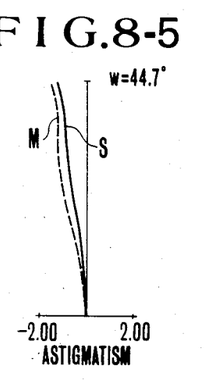
Figure 86:
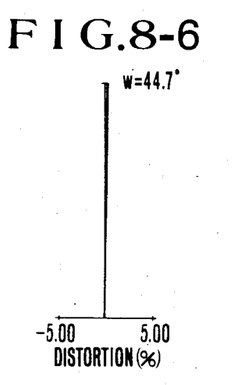
Figure 87:
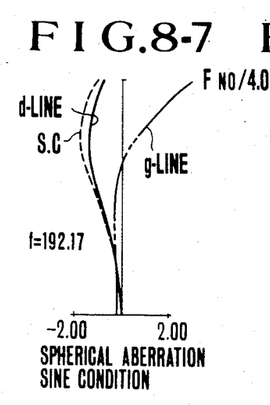
Figure 88:
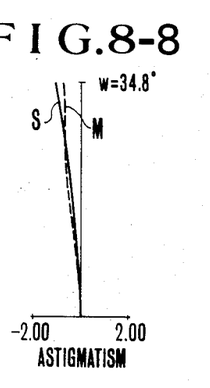
Figure 89:
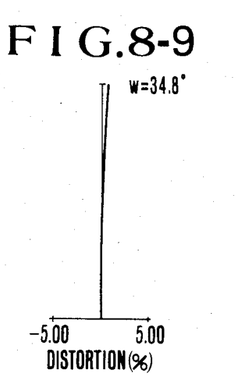
Figure 91:
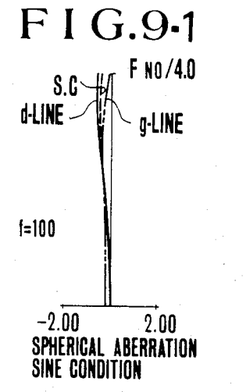
Figure 92:
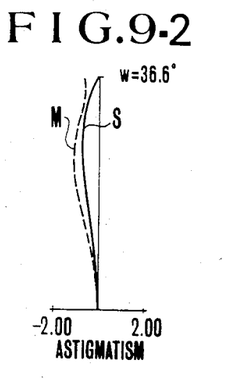
Figure 93:
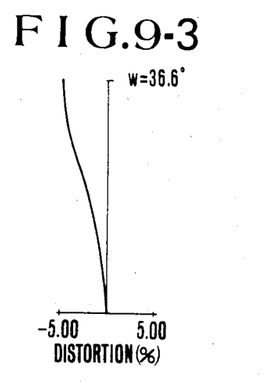
Figure 94:
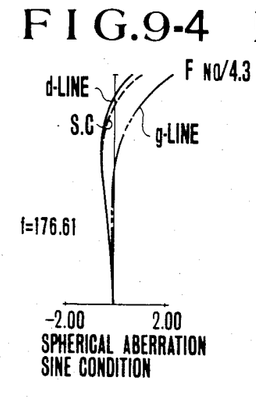
Figure 95:
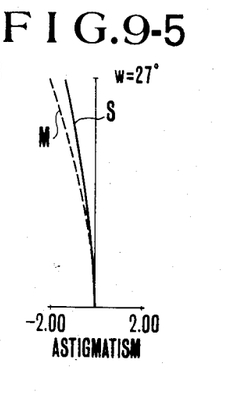
Figure 96:
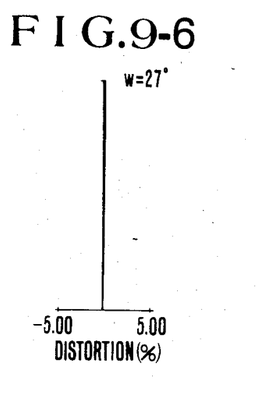
Figure 97:
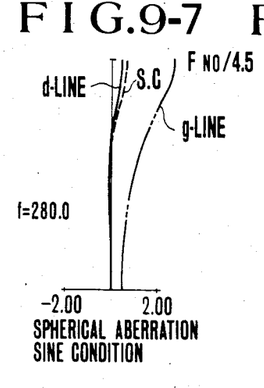
Figure 98:
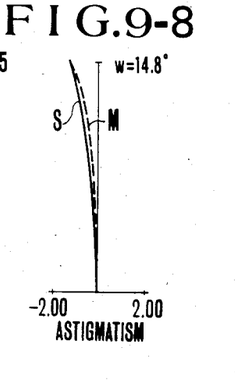
Figure 99:
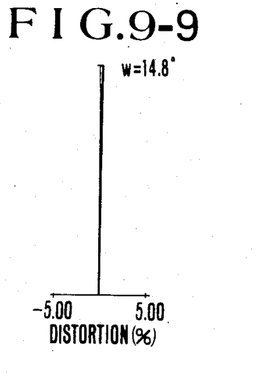
Figure 101:
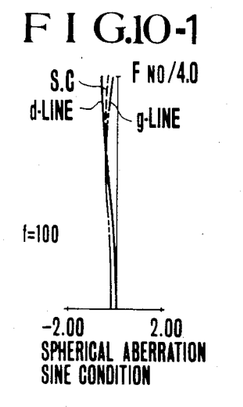
Figure 102:
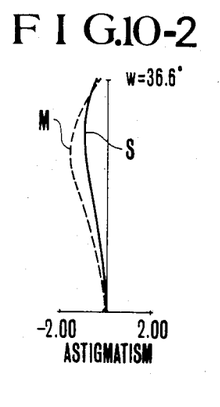
Figure 103:
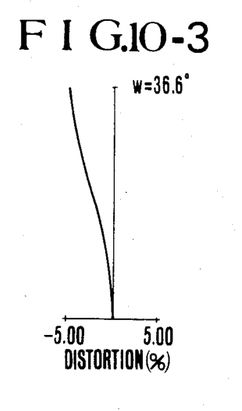
Figure 104:
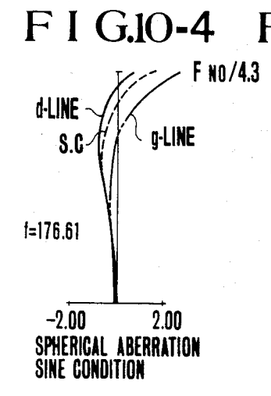
Figure 105:
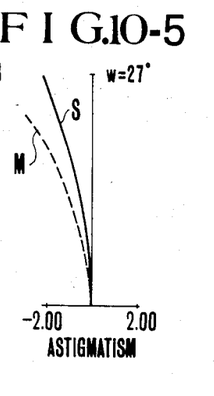
Figure 106:
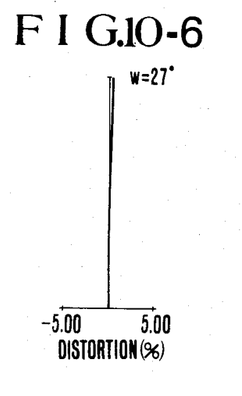
Figure 107:
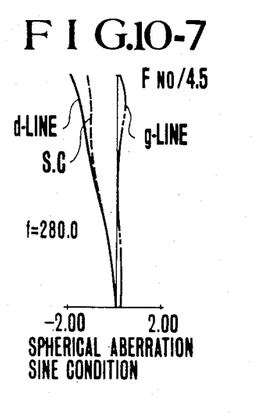
Figure 108:
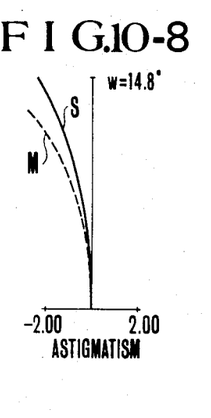
Figure 109:
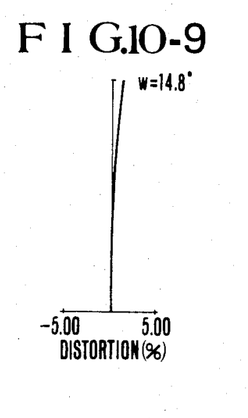

In the embodiment of FIG. 1, the rear subcomponent $II_2$ is made movable for focusing in such a way that when focused on a close object point, the rear subcomponent $II_2$ lies at a position $II_2'$ shown by dashed lines. A solid line A indicates a path of zooming movement of the subcomponent $II_2$ with an object at infinity, and another or dashed line B indicates a different path of zooming movement of the subcomponent $II_2$ with an object at a close distance. A hatched area C represents a range of focusing movement of the lens subcomponent $II_2$. Since the rear subcomponent $II_2$ makes unified movement as part of the 2nd lens component when zooming, it has different image magnifications depending upon the focal length.

It is, therefore, in the predesign of zoom lens of FIG. 1 that while adjusting the control of variation of the image magnification of the rear subcomponent $II_2$, the refractive power arrangement over the entire lens system is determined, thereby the difference between the total focusing movements of the subcomponent $II_2$ at the wide angle and telephoto positions is minimized. In the 1st and 2nd specific embodiments of the zoom lens according to the present invention to be described later, there is a further feature that a refractive power arrangement which provides variation of that difference as a linear function of the focal length of the entire system is realized. In other words, referring to FIG. 1, not only the paths of movement of the rear subcomponent $II_2$, A and B, for infinitely distant and close objects are made linear, but also all those of movement for intermediate object distances are made linear. By utilizing this linearity, the focusing control mechanism can be constructed in a simple form.

Though the present invention has been described in connection with the division of the 2nd lens component into two parts, the zoom lenses according to the present invention may be otherwise formed by dividing the 2nd lens component into three or more subcomponents which are partly made movable for focusing with an advantage that the weight and size of the entire lens system can be further reduced.

The division of the 2nd lens component into two subcomponents one of which is moved to effect focusing has two different aspects, one of which is that the front and rear subcomponents take positive and negative refractive powers respectively, and either the positive front, or the negative rear is made to move for focusing purposes. As has been stated in connection with the FIG. 1 embodiment, when the 2nd component is divided into the positive front and negative rear parts, as the 2nd component lies forward in the telephoto position, leaving a wider air space in rear thereof, the rear part is advantageously selected for employment as the focusing subcomponents, provided that the focusing subcomponent is moved rearward as focusing is effected down to shorter object distances. Since, the air space between the 2nd component and the film plane can, therefore, be effectively utilized, a minimization of the bulk and size of the entire system is facilitated. Also, the use of the front subcomponent $II_1$ of positive power as the focusing subcomponent has an alternative advantage that, because the positive refractive power of the focusing subcomponent is strengthened thanks to the provision of the rear subcomponent $II_2$ of negative power, the total focusing movement can be lessened.

With the 2nd component divided into front negative and rear positive subcomponents $II_{11}$ and $II_{22}$ conversely of the above, when the rear subcomponent $II_{22}$ of positive power is made movable for focusing, because, similarly to the above, the positive refractive power of the focusing subcomponent can be strengthened thanks to the provision of the negative rear subcomponent, the total focusing movement can be lessened. The selection of the negative front subcomponent $II_{11}$ for employment as the focusing subcomponent produces an advantage that even when focusing down to closer object distances, the aberrations vary to a relatively small extent, and particularly the astigmatism has a small variation, and, therefore, is preferred from the aberration correction standpoint.

In the case of the former division of the 2nd component into two subcomponents of which the front is of positive power and the rear is of negative power, it is preferred to satisfy the following inequalities of condition:

$$-6.0 < \phi2/\phi22 < -2.0 \quad (1)$$

where $\phi2$ is the overall refractive power of the 2nd lens component and $\phi22$ is the refractive power of the focusing subcomponent. When the lower limit of the aforesaid inequalities is exceeded, the refractive power of the focusing subcomponent is too weak to prevent the total focusing movement from being objectionably increased. When the upper limit is exceeded, the determination of the refractive power arrangement over the entire lens system so as to linearize the path of zooming movement B as shown in FIG. 1 results in that each lens component has a strong refractive power. This is not preferred from the point of view of the aberrational problem and lens manufacturing techniques. The specific embodiments 1, 2 and 3 of the present invention to be described later have ranges from 35 mm to 70 mm and from 28 mm to 85 mm for the 35 mm format with the F-number in order of about 4. For such dimensions, it is preferred that the above-described factor in inequalities (1) satisfies in particular the following inequalities:

$$-5.0 < \phi2/\phi22 < -3.1$$

The 2nd component may be otherwise divided into three subcomponents of negative, positive and negative refractive powers in this order from the front, one of which is made movable for focusing. Such focusing method is preferable because the aberrations are more stabilized over the focusing range. Particularly when the intermediate part of positive power is used as the focusing subcomponent, because of the existence of the negative subcomponent, as the positive refractive power can be strengthened, the total focusing movement can be reduced, and good correction of aberrations can be facilitated.

It is also preferred as well as the above that the 2nd component is divided into three subcomponents parts of positive, negative and positive refractive powers, one of which is made movable for focusing. Another advantage arising from the division of the 2nd component into the three subcomponents is that one of the two components other than the focusing one can be made to move in differential relation to the focusing subcomponent thereby good stability of aberration correction throughout the focusing range can be achieved. It is also possible to move the front and rear subcomponents to effect focusing while the intermediate subcomponent remains stationary. This gives an advantage that the total focusing movement decreases with decrease in the range of variation of aberrations.

The focusing method for zoom lenses according to the present invention is applicable to so-called autofocus-equipped zoom lenses also. In this case, by virtue of the above-described linearity utilized in the means for preventing image shift during zooming, it is possible to change over image from the automatic to the manual mode, and also to reverse this changing-over. It is also to be noted that automatic and manual focusings may be changed over by using different lens components from each other, for example, by moving part of the 2nd lens component to effect automatic focusing, and by moving the 1st lens component to effect manual focusing.

Next, numerical examples of the present invention are given. In the numerical examples, Ri is the radius of curvature of the i-th lens surface counting from front, Di is the i-th lens thickness or air separation counting from front, and Ni and $\nu$i are the refractive index and Abbe number of the glass of the i-th lens element counting from front.

| F = 100-195 | FNO = 1:4.0 | 2ω = 34.8°-62° |
| --- | --- | --- |

-continued

Numerical Example 1

| | | | | |
|---|---|---|---|---|
| R1 = 178.634 | D1 = 6.27 | N1 = 1.69680 | $\nu1$ = 55.5 |
| R2 = 56.371 | D2 = 23.92 | | |
| R3 = −382.453 | D3 = 4.87 | N2 = 1.69680 | $\nu2$ = 55.5 |
| R4 = 249.001 | D4 = 6.12 | | |
| R5 = 104.352 | D5 = 8.40 | N3 = 1.75520 | $\nu3$ = 27.5 |
| R6 = 311.818 | D6 = Variable | | |
| R7 = 355.217 | D7 = 8.39 | N4 = 1.60311 | $\nu4$ = 60.7 |
| R8 = −220.166 | D8 = 0.27 | | |
| R9 = 91.776 | D9 = 9.32 | N5 = 1.60311 | $\nu5$ = 60.7 |
| R10 = 277.367 | D10 = } 6.72 | | |
| R11 = Stop | D11 = | | |
| R12 = 73.036 | D12 = 10.49 | N6 = 1.58913 | $\nu6$ = 61.0 |
| R13 = 329.914 | D13 = 2.28 | | |
| R14 = −490.027 | D14 = 17.11 | N7 = 1.84666 | $\nu7$ = 23.9 |
| R15 = 61.576 | D15 = 3.83 | | |
| R16 = 166.722 | D16 = 12.06 | N8 = 1.74950 | $\nu8$ = 35.3 |
| R17 = −109.306 | D17 = Variable (in Focusing) | | |
| R18 = −1621.772 | D18 = 8.56 | N9 = 1.58144 | $\nu9$ = 40.7 |
| R19 = 81.850 | D19 = 5.95 | | |
| R20 = 145.805 | D20 = 9.11 | N10 = 1.67270 | $\nu10$ = 32.1 |
| R21 = 2517.126 | D21 = Variable | | |

| Focal Length | D6 | D21 |
|---|---|---|
| 100 | 68.18 | 115.07 |
| 147.80 | 24.27 | 152.90 |
| 194.60 | 2.18 | 189.94 |

D17 = 2.47 (for Infinitely Distant Object)

F = 100−192    FNO = 1:4.0    $2\omega$ = 34.8°−62°

Numerical Example 2

| | | | | |
|---|---|---|---|---|
| R1 = 161.365 | D1 = 7.77 | N1 = 1.65844 | $\nu1$ = 50.9 |
| R2 = 56.458 | D2 = 21.20 | | |
| R3 = −257.404 | D3 = 6.10 | N2 = 1.69680 | $\nu2$ = 55.5 |
| R4 = 125.942 | D4 = 6.02 | | |
| R5 = 101.936 | D5 = 14.35 | N3 = 1.68893 | $\nu3$ = 31.1 |
| R6 = −806.464 | D6 = Variable | | |
| R7 = 137.406 | D7 = 9.21 | N4 = 1.61765 | $\nu4$ = 55.0 |
| R8 = 1285.594 | D8 = 0.28 | | |
| R9 = 102.581 | D9 = 11.28 | N5 = 1.62299 | $\nu5$ = 58.2 |
| R10 = 429.493 | D10 = } 7.44 | | |
| R11 = Stop | D11 = | | |
| R12 = 60.525 | D12 = 12.75 | N6 = 1.60738 | $\nu6$ = 56.8 |
| R13 = −6238.789 | D13 = 1.52 | | |
| R14 = −367.209 | D14 = 6.66 | N7 = 1.84666 | $\nu7$ = 23.9 |
| R15 = 51.006 | D15 = 9.99 | | |
| R16 = 162.919 | D16 = 9.33 | N8 = 1.62004 | $\nu8$ = 36.3 |
| R17 = −104.526 | D17 = Variable (in Focusing) | | |
| R18 = 1325.943 | D18 = 5.51 | N9 = 1.56384 | $\nu9$ = 60.7 |
| R19 = 88.568 | D19 = 8.33 | | |
| R20 = 151.114 | D20 = 6.39 | N10 = 1.62374 | $\nu10$ = 47.1 |
| R21 = 56.652 | D21 = 10.70 | N11 = 1.62004 | $\nu11$ = 36.3 |
| R22 = 705.265 | D22 = Variable | | |

| Focal Length | D6 | D22 |
|---|---|---|
| 100 | 76.41 | 113.75 |
| 146.08 | 27.96 | 150.00 |
| 192.17 | 2.75 | 186.25 |

D17 = 0.74 (for Infinitely Distant Object)

F = 100−280    FNO = 1:4.0−4.5    $2\omega$ = 29.5°−73.3°

Numerical Example 3

| | | | | |
|---|---|---|---|---|
| R1 = 476.533 | D1 = 18.37 | N1 = 1.60311 | $\nu1$ = 60.7 |
| R2 = −31427.113 | D2 = 0.46 | | |
| R3 = 265.367 | D3 = 6.74 | N2 = 1.80400 | $\nu2$ = 46.6 |
| R4 = 74.316 | D4 = 30.68 | | |
| R5 = 1359.336 | D5 = 14.41 | N3 = 1.63636 | $\nu3$ = 35.4 |
| R6 = −204.127 | D6 = 1.18 | | |
| R7 = −196.061 | D7 = 4.43 | N4 = 1.80400 | $\nu4$ = 46.6 |
| R8 = 292.534 | D8 = 4.40 | | |
| R9 = 120.943 | D9 = 11.49 | N5 = 1.80518 | $\nu5$ = 25.4 |
| R10 = 239.607 | D10 = Variable | | |
| R11 = 154.329 | D11 = 10.34 | N6 = 1.71300 | $\nu6$ = 53.8 |
| R12 = −2409.517 | D12 = 0.24 | | |
| R13 = 88.781 | D13 = 10.51 | N7 = 1.77250 | $\nu7$ = 49.6 |
| R14 = 174.940 | D14 = } 9.73 | | |
| R15 = Stop | D15 = | | |
| R16 = 89.161 | D16 = 9.30 | N8 = 1.71300 | $\nu8$ = 53.8 |
| R17 = 172.033 | D17 = 2.99 | | |
| R18 = 1281.339 | D18 = 7.48 | N9 = 1.84666 | $\nu9$ = 23.9 |
| R19 = 59.078 | D19 = 10.56 | | |
| R20 = 231.158 | D20 = 14.38 | N10 = 1.76200 | $\nu10$ = 40.1 |
| R21 = −165.225 | D21 = Variable (in Focusing) | | |
| R22 = −1151.822 | D22 = 5.37 | N11 = 1.56732 | $\nu11$ = 42.8 |
| R23 = −359.383 | D23 = 4.04 | N12 = 1.79952 | $\nu12$ = 42.2 |
| R24 = 185.200 | D24 = 10.35 | | |
| R25 = 269.834 | D25 = 7.01 | N13 = 1.66680 | $\nu13$ = 33.0 |
| R26 = −564.432 | D26 = Variable | | |

| Focal Length | D10 | D25 |
|---|---|---|
| 100 | 140.80 | 130.75 |
| 176.61 | 46.42 | 192.46 |
| 280.0 | 0.92 | 275.78 |

D21 = 0.57 (for Infinitely Distant Object)

What we claim:

1. A zoom lens comprising:
two lens components, said two lens components being, from front to rear,
a first lens component having a negative refractive power,
a second lens component having a positive refractive power and a plurality of lens subcomponents, those lens subcomponents moving unitedly along the optical axis during zooming, wherein
zooming is performed by varying the air separation between said first lens component and said second lens component, and
focusing is performed by moving one of the plurality of said subcomponents of said second lens component.

2. A zoom lens according to claim 1, wherein said 2nd lens component has two lens subcomponents of positive and negative refractive powers, and focusing is performed by one of said two lens subcomponents.

3. A zoom lens according to claim 2, wherein said two lens subcomponents comprise, from front to rear, a front lens subcomponent of positive refractive power and a rear lens subcomponent of negative refractive power, and
focusing is performed by moving said rear lens subcomponent.

4. A zoom lens according to claim 2, satisfying the relationship $$-6.0 < \phi2/\phi22 < -2.0$$

where $\phi2$ is the refractive power of said second lens component and $\phi22$ is the refractive power of said lens rear subcomponent.

5. A zoom lens comprising:
a front lens component which moves along the optical axis during zooming;
a rear lens component arranged on the image side of the front lens component, having a power reverse to that of the front lens component and including two lens subcomponents which move unitedly along the optical axis during zooming, one of said two lens subcomponents being movable along the optical axis for focusing.

6. A zoom lens according to claim 5, in which one of the two lens subcomponents of the rear lens component moves apart from the other lens subcomponent for focusing.

7. A zoom lens according to claim 6, in which the lens subcomponent which moves for focusing is arranged on the image side and has a negative power.

8. A zoom lens according to claim 5, in which the front lens component has a negative power and the rear lens component has a positive power.

* * * * *